United States Patent [19]
Felder

[11] 4,445,962
[45] May 1, 1984

[54] TIRE BUILDING DRUM

[75] Inventor: Gregory F. Felder, Stow, Ohio

[73] Assignee: The B. F. Goodrich Company, Akron, Ohio

[21] Appl. No.: 394,203

[22] Filed: Jul. 1, 1982

[51] Int. Cl.³ ............................................. B29H 17/16
[52] U.S. Cl. .................................... 156/398; 156/420; 156/414; 156/417
[58] Field of Search ........ 156/398, 414, 415, 416–417, 156/418–420

[56] References Cited

U.S. PATENT DOCUMENTS

| | | | |
|---|---|---|---|
| Re. 22,369 | 8/1943 | Bostwick | 156/415 |
| 1,913,374 | 6/1933 | Dexter | 156/420 |
| 2,168,897 | 8/1939 | Bostwick | 156/420 |
| 2,699,198 | 1/1955 | Balzhiser | 156/417 |
| 2,715,932 | 8/1955 | Frazier | 156/417 |
| 3,366,526 | 1/1968 | Winslow | 156/420 |

FOREIGN PATENT DOCUMENTS 509460 4/1976 U.S.S.R. .............................. 156/414

Primary Examiner—Lois E. Boland
Attorney, Agent, or Firm—Harry F. Pepper, Jr.

[57] ABSTRACT

A collapsible tire building drum having a collapsible central cylindrical portion composed of a plurality of drum segments. The outer laterally spaced edges of the drum segments are grooved for connecting annular rings to the respective edges. Each of the annular rings is composed of a plurality of arcuate segments whose profile is the same at the juncture with the drum segments but tapers radially outwardly and upwardly and thence curves downwardly and inwardly to provide an off-set under cut portion.

4 Claims, 5 Drawing Figures

TIRE BUILDING DRUM

BACKGROUND OF THE INVENTION

This invention relates to tire building and more particularly to a new and improved tire building drum that is collapsible for use in the forming of green tires.

In the building of green tires with multiple beads for heavy duty use such as by aircraft in high speed landings, it has become important to make a tire building drum that will facilitate the removal of the green tire from the tire building drum. Such tire drums have high crowns with deep undercut side flanges against which the multiple tire beads are positioned when the tire is being formed or built. These tires have relatively large cross-sectional areas and relatively small bead diameters. To improve the construction of these tires, the respective lateral side segments have been made removable to facilitate the collapse of the inner circumferential segments. More recently efforts had been made to retain the lateral side segments or end rings on the green tire while collapsing the plurality of drum segments (or inner circumferential segments). Thereafter with the inner drum segments collapsed the green tire and the end rings are removed from the drum. The end rings are then disassembled from the green tire. Note U.S. Pat. No. 3,366,526. The present invention is directed to a new and improved collapsible drum that in addition to facilitating the easy removal of a finished green tire also improves the side drum contour which permits less distortion of the green tire at the bead regions. This tire drum construction requires less movement of the ply stock and the rubber in the bead area during the curing process thereby substantially enhancing the quality of the tire being built since there is less movement of the materials. The drum includes end rings that are detachably removed from the drum and the green tire prior to collapse of the drum.

SUMMARY OF THE INVENTION

A collapsible tire building drum that has a plurality of circumferentially spaced drum segments forming a cylindrical tire building surface. The drum segments are collapsible to permit the removal of a tire built thereon in a flat band form. The outer annular edges are grooved to facilitate the attachment of laterally spaced annular rings onto such drum segments. The annular rings tapers radially outwardly and upwardly and thence curves downwardly and inwardly to provide undercut edges for multiple beads of a green tire built thereon.

DETAILED DESCRIPTION

Figure 1:
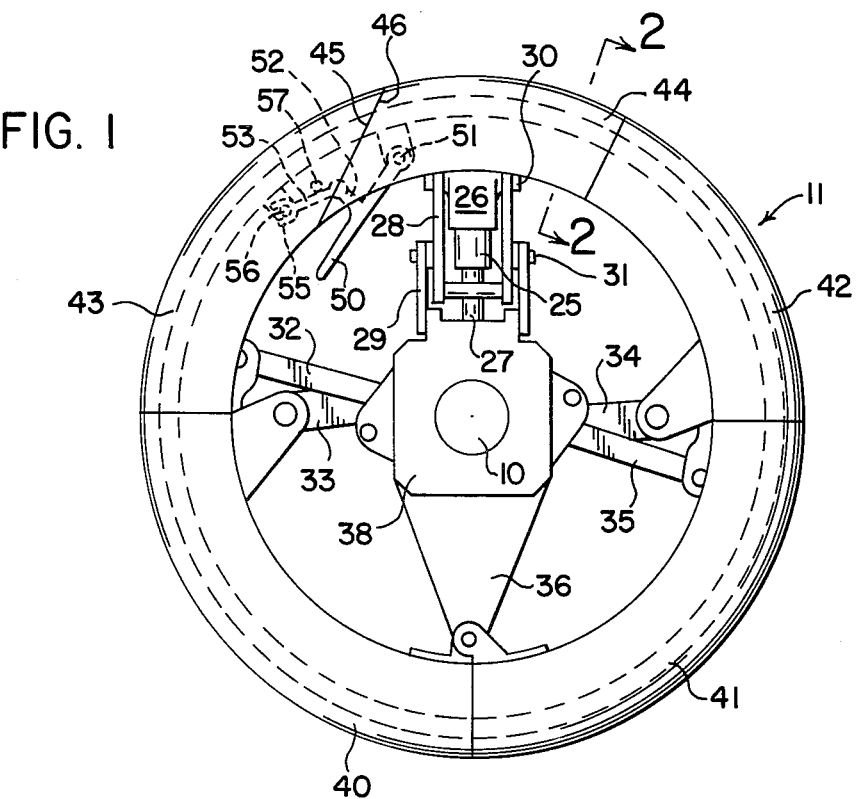
FIG. 1 is a front elevational view of a collapsible tire building drum having detachable bead flanges or segments.

Referring now to the drawings, wherein like reference numerals designate like or corresponding parts throughout the several views, there is shown in FIG. 1 a horizontal shaft 10 of a cylindrical collapsible tire building drum 11 of known construction. The drum 11 is expanded and collapsed by suitable mechanism within the core, the operation of which is well known in the art.

The drum 11 is of a type used for building heavy duty tires such as those containing multiple beads. Drum 11 includes a plurality of centrally disposed circumferential extending and interconnected body segments 15, wing segments 16 adjustably fixed to segments 15 by screws 17, thin gap-shield segments 18, and a pair of laterally spaced annular segmental collapsible bead seating flanges or rings 20 and 21.

The central body segments 15 are hinged with one segment 15 connected to a telescopic bracket whereby through the toggle links the drum is collapsed in a manner to be described and one which is well known in the art. The wing segments 16 are adjustably fixed on central segments 15 by screws 17 whose stems occupy slots 22 in the body segments, thus permitting lateral or axial adjustment. The outer edges of the respective wing segments 16 are grooved as at 23 formed around the inside edge of each end circumferential margin of the tire drum 11 to connect the annular rings 20 and 21 to the drum in a manner to be described.

The mechanism for expanding and collapsing the central segments 15 include a plurality of segments, one of which is collapsible from the position shown in FIG. 1 by the telescoping of sleeve 25 into boss 26, and pin 27 into sleeve 25. Boss 26 supports the central segments. Such telescoping movement of the boss, sleeve and pin 27 is accomplished by suitable toggle links 28 and 29 pivoted at 30 and 31. The pivoting action is effected by lateral or axial movement of bracket 38 that is journaled on shaft 10. This action removes the described mechanism from the core of the drum to facilitate the collapse of the other segments of the drum via the lever arrangements. The remaining segments are pivoted by means of levers 32, 33, 34, 35 and 36 connected to rotatable bracket which are mounted on the horizontal shaft 10. These power operated means to collapse and expand these segments are old and well known in the art. See U.S. Pat. Nos. 2,699,197, U.S. Pat. No. 1,913,374 and U.S. Pat. No. Re. 22,369. The mechanism to collapse and expand the drum is used by way of illustration. It is used only to give one illustration of such a means and is not to be considered a limitation thereby.

The segmental bead seating flanges or rings 20 and 21 are identical in construction and only one will be described. Ring 20 is composed of arcuate shoulder segments 40, 41, 42, 43 and 44, which shoulder segments when assembled on the drum abut each other to form a single circumferentially disposed ring. Segment 44, which is located between segments 43 and 42 is the first segment removed when the ring 20 is to be disassembled from the drum. Segment 44 has a tapered end 45 which abuttingly engages tapered end 46 on the adjacent arcuate segment 43 in the assembled condition.

The segments 40 through 44 of ring 20 are locked in their assembled condition by a toggle latch or lever 50 whose one end is pivotably connected to segment 44 by a pivot means 51. Lever 50 has an abutment 52 pivotably supporting a link 53, which link 53 has a yoke 55 which in turn engages a pin 56 on segment 43. FIG. 1 shows the latch or lever 50 in the locked position. To unlock the ring 20, latch 50 is rotated in a counterclockwise direction as viewed in FIG. 1, swinging lock 50 and link 53 around pivot 51 free and clear of the pin 56. The arcuate segment 44 can then be removed from the green tire, after which the other segments can be removed from the tire. In locking latch 50, the clockwise rotation of link 53 is limited by a pin 57 located on segment 43.

Figure 4:
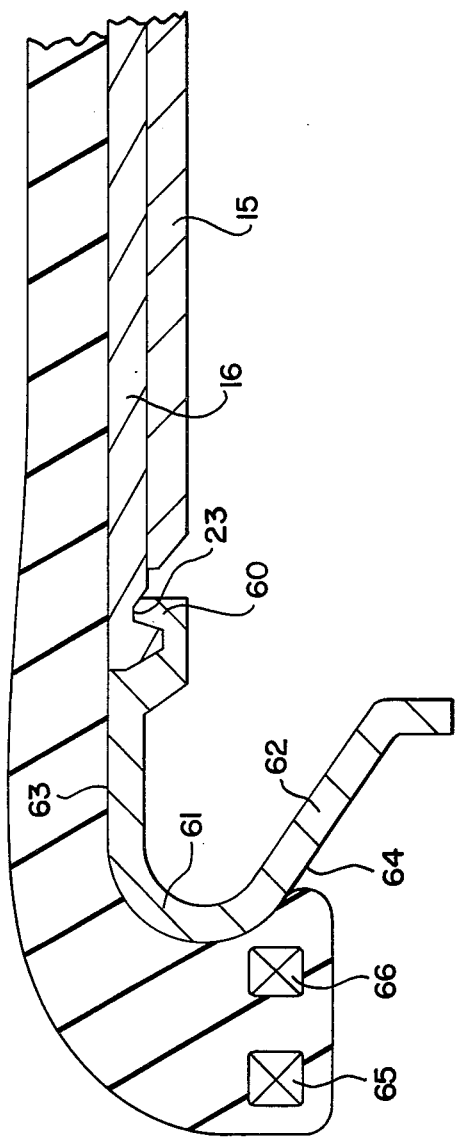
FIG. 4 is an enlarged cross-sectional view of an edge portion of a conventional tire building drum with a high crown and deep undercut side flange and a portion of a conventional green tire.

The prior art shape of such annular shoulder segments is shown in FIG. 4. These segments have an abutment or a hooked portion 60 which frictionally engages and interlocks with the groove 23 in the wing segments 16. Both the wing segments 16 and the respective segments are arcuate in shape. These segments project laterally as a continuation of the drum to form a smooth peripheral surface that is substantially flush with the cylindrical surface of the tire building drum wing segments 16. Each shoulder segment then curves downwardly as at 61 (in FIG. 4), thence downwardly and backwardly as at 62 under its top surface 63. When all such arcuate segments are assembled at each end of the drum the outer annular face 64 of the shoulder segments form an annular bead-receiving recess at each drum margin in which the beads 65 and 66 of a tire are fitted during the construction of a tire.

Figure 3:
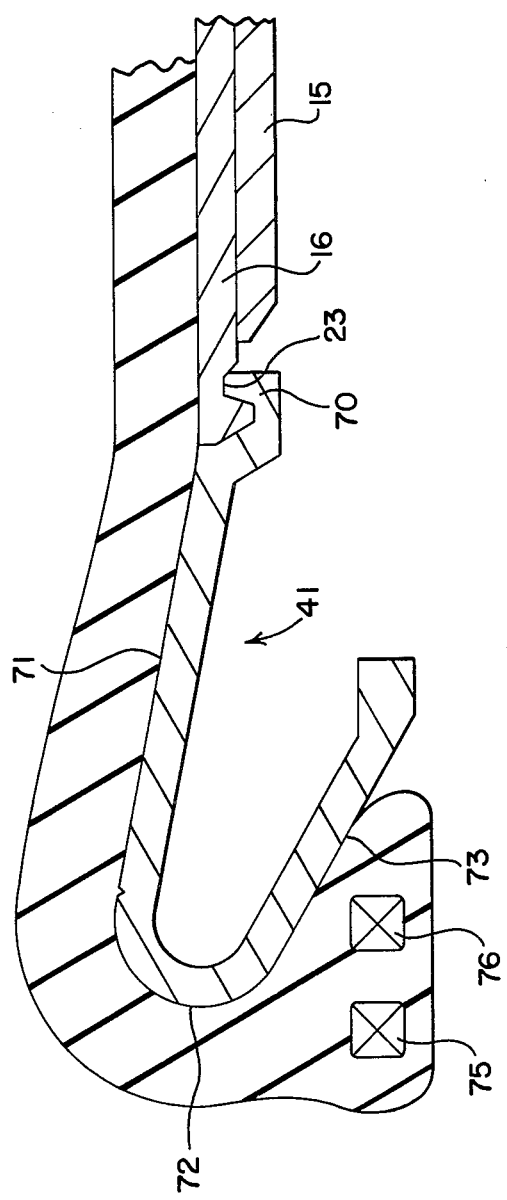
FIG. 3 is an enlarged cross-sectional view of an edge portion of the tire building drum shown in FIG. 2 with a portion of the green tire thereon.

The improved construction of the shoulder segments 40, 41, 42, 43 and 44 is shown in FIG. 3. The drum segments shown in FIGS. 3 and 4 are both directed to the building of the same diameter tire and in the example shown is 16.5 inch diameter drum. Only one segment 41 will be described, it being understood that all such segments are of the same cross-sectional construction. Segment 41 has a hooked portion or abutment 70 which frictionally engages the groove 23 of wing segment 16. The hooked portion 70 is arcuate in shape just as the segment 41 such that when all segments 40 through 44 are assembled the respective hooked portions positively engage the circumferential recess 23. The hook portion 70 of segment 41 extends or tapers laterally upwardly or radially outwardly as at 71 from the smooth cylindrical tire building surface of drum 10, thence curving downwardly as at 72 and thence curving downwardly and tapering radially inwardly under its radially extending portion 71 as at 73 to form an undercut portion or an offset face portion. As discussed above, the respective segments 40, 41, 42, 43 and 44 when assembled at the end or edges of the drum, the offset faces 73 form an annular bead-receiving recess at the respective side edges of the drum crown for receiving multiple beads of a tire and the associated fabric in the construction of a tire. It should be noted that with this type of construction, the bead area of the green tire being constructed has less distortion when compared with a corresponding drum of the same diameter, particularly when considering the fact that the green tire as built on the drum as illustrated by FIGS. 3 and 4 must be shaped to that configuration shown in FIG. 5.

Figure 2:
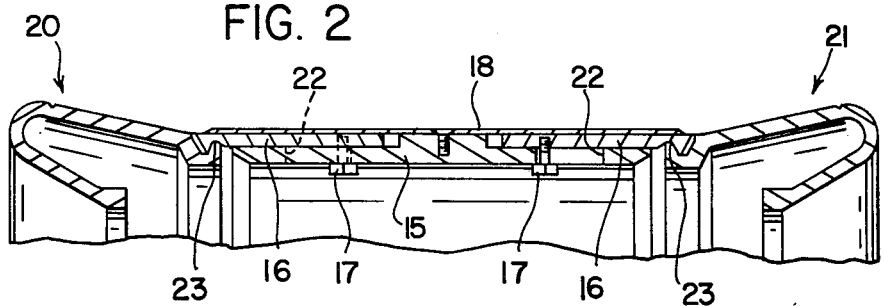
FIG. 2 is a fragmentary side elevational view partly in section taken on line 2—2 of FIG. 1.
Figure 5:
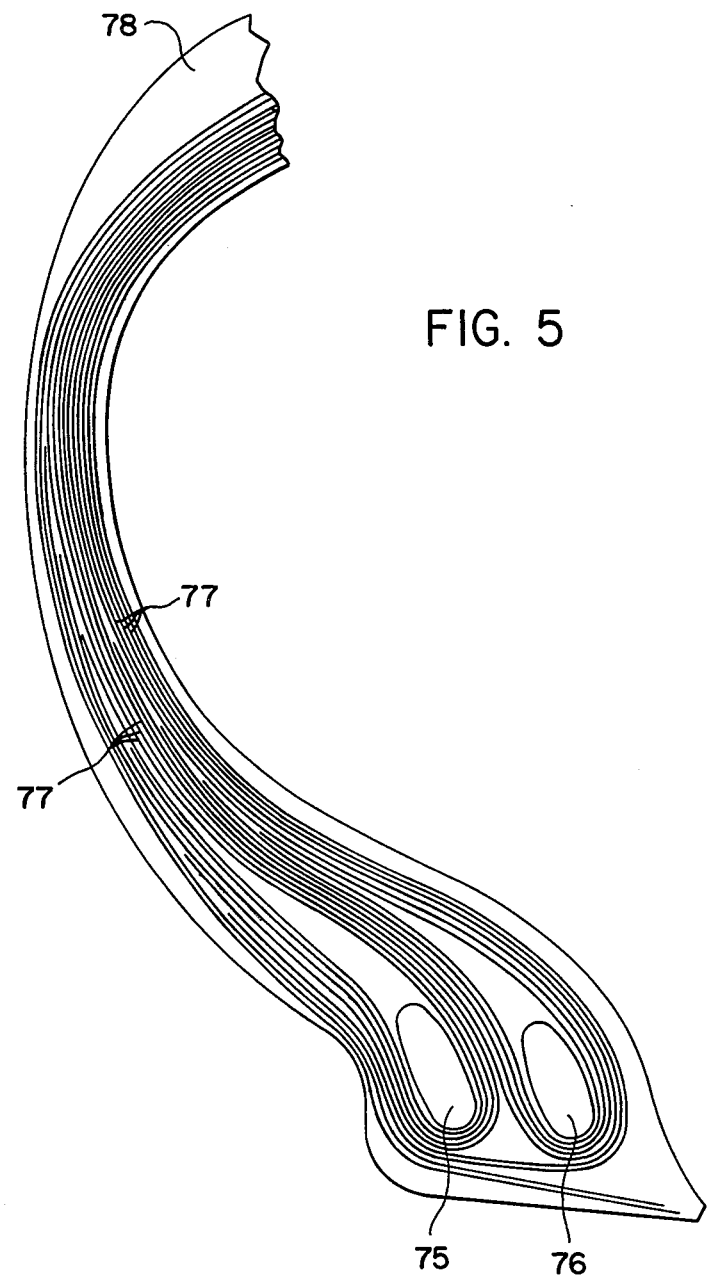
FIG. 5 is a cross-sectional view of a portion of a cured tire of a double bead type.

A green tire built on drum 11 is to have a final construction and configuration similar to that shown in FIG. 5 containing multiple beads (side by side bead wires) and is toroidal in configuration. The tire carcass includes multiple beads (annular bead wire bundles) 75 and 76 on one side with similar construction on the other side of the tire carcass. Each multiple bead such as 75 is provided with a wrapper, a flipper and a plurality of plies 77 as shown in FIG. 5 of reinforcing cord fabric, such as nylon, rayon, cotton, or other suitable material. The reinforcing plies are embedded in the carcass and are folded around the multiple beads. The tire carcass includes a circumferentially extending tread portion and a shoulder 78. In constructing such a tire on a tire building drum such as that shown in FIGS. 1 and 2, a liner is first wrapped about the drum 11. Successive separate plies are then wrapped about the drum, the bead 76 and its wrapper, flipper is then positioned against the off-set face 73. A turn up of the plies about bead 76 is effected and then additional plies 77 are wrapped about the drum. The second bead 75 is then placed against the plies and the first bead 76, afterwhich a turn up of the additional plies is effected. Additional plies can then be added as well as sidewalls, shoulder rubber, finishing strips and tread. The placement of such beads, plies and other tire carcass material has a greater radius of curvature when using the construction of the drum illustrated by FIG. 3 such that after removing the annular rings 20 and 21 upon release of latch mechanism 50, the drum is collapsed and the green tire removed. The green tire is then placed in a molding apparatus which changes the configuration of the green tire from a flat cylindrical band to a toroidal shape. It is in this vulcanizing process that the beads, plies and rubber material is physically moved in configuration to the form shown in FIG. 5. By shaping the annular rings 20 and 21 with a sweep up or a radial expansion to a diameter larger than the drum itself, less physical disturbance of the bead and plies is necessary thereby enhancing the quality of the tire being built.

Various modifications are contemplated and may obviously be resorted to by those skilled in the art without departing from the described invention, as hereinafter defined by the appended claims, as only a preferred embodiment thereof has been disclosed.

I claim:

1. A collapsible tire building drum comprising a support shaft having a longitudinal center line,
   a plurality of circumferentially spaced arcuate drum segments spaced radially around said shaft,
   power operated means mounted on said shaft and connected to said segments for expanding and contracting said drum segments, said drum segments in the expanded condition being cooperative to define a circumferentially extending cylindrical surface with two annular axially spaced edges,
   an end forming ring abuttingly attached to the respective edges of said drum segments, each of said end forming rings having an off-set face portion, and each of said end forming rings having a circumferentially extending surface that tapers outwardly and upwardly away from said cylindrical surface thence curving downwardly into said off-set face portion.

2. A collapsible tire building drum as set forth in claim 1 wherein each of said off-set face portions on said end forming rings defines an undercut portion for receiving the beads of a tire built on said drum.

3. A collapsible tire building drum as set forth in claim 2 wherein said undercut portion of said end forming ring tapers from the outermost peripheral edge axially inwardly and radially downwardly toward said longitudinal center line of said drum.

4. A collapsible tire building drum as set forth in claim 3 wherein each of said end forming rings is made up of a plurality of detachable segmented portions.

* * * * *